United States Patent [19]

Wilson et al.

[11] Patent Number: 4,870,243
[45] Date of Patent: Sep. 26, 1989

[54] ELECTRICAL DISCHARGE METHODS AND APPARATUS THEREFOR

[75] Inventors: Geoffrey Wilson, Chesterfield; Gareth A. Evans, Sheffield, both of England

[73] Assignee: Sarclad International Limited, Derbyshire, United Kingdom

[21] Appl. No.: 231,082

[22] Filed: Aug. 11, 1988

[30] Foreign Application Priority Data

Aug. 13, 1987 [GB] United Kingdom ............... 8719187

[51] Int. Cl.$^4$ .............................................. B23H 1/08
[52] U.S. Cl. ............................ 219/69.14; 219/69.17
[58] Field of Search ............... 219/69 D, 69.14, 69.17, 219/69.16, 69.2

[56] References Cited

U.S. PATENT DOCUMENTS

| | | | |
|---|---|---|---|
| 4,375,588 | 3/1983 | Frei | 219/69 D |
| 4,417,962 | 11/1983 | Inoue | 219/69 D |
| 4,553,012 | 11/1985 | Anderson | 219/69 E |

FOREIGN PATENT DOCUMENTS

| | | | |
|---|---|---|---|
| 54-20718 | 7/1979 | Japan | 219/69 D |
| WO80/00669 | 4/1980 | PCT Int'l Appl. | |
| 1121923 | 7/1968 | United Kingdom. | |
| 2065935 | 7/1981 | United Kingdom. | |
| 2074073 | 10/1981 | United Kingdom. | |

OTHER PUBLICATIONS

"The Role of the Dielectric Fluid in Electrical Discharge Machining" by Terry Hockenberry, 10/1968, pp. 1-9.

*Primary Examiner*—A. D. Pellinen
*Assistant Examiner*—Geoffrey S. Evans
*Attorney, Agent, or Firm*—Kinney & Lange

[57] ABSTRACT

An electrical discharge apparatus comprises a plurality of electrodes mounted on an electrode carrier and spaced from a workpiece surface to define a gap across which a train of electrical pulses are transmitted. Dielectric fluid is present within the gap and controlled additions of solid particles are made to the dielectric fluid, with the particles being of a material of different electrical conductivity and/or permittivity to that or those of the dielectric fluid. The concentration by volume of the particles within the dielectric fluid lies within the range 0.05% to 7.0% and the size of the majority of the added particles is in excess of 7 microns. The particles are of a material having a relatively high electrical conductivity, e.g., graphite or metallic particles. Alternatively, the particles are formed from a material having good electrical insulating properties, e.g., glass, ceramic or certain metallic oxides.

14 Claims, 4 Drawing Sheets

ELECTRICAL DISCHARGE METHODS AND APPARATUS THEREFOR

FIELD OF THE INVENTION

This invention relates to a method of and apparatus for machining or applying a finish to a surface of a workpiece by an electrical discharge technique in which a series of electrical pulses is passed across a gap between an electrode and a workpiece surface immersed in a dielectric fluid. More especially the invention concerns a method of and apparatus for applying a textured or matt finish to the surface of a work-roll used in the rolling of metallic products such as steel sheet and strip to produce on the rolled products a complementary textured or matt finish.

Hithertoo, the work surfaces of mill rolls have been textured by, for example, shot blasting techniques in which steel shot is directed onto the roll surface at high velocity to create at the surface a multiplicity of pits and craters. A complementary textured or matt surface is reproduced on flat products worked by the rolls thereby enhancing the lubricant and paint adherence properties of the products. Texturing is also used to produce an aesthetically appealing surface finish to certain products.

Shot blasting techniques are subject to several disadvantages and limitations. Thus, the ability to produce on a work surface or mill roll a textured or matt finish is dependent upon the hardness of the roll; many rolls having relatively hard surfaces such as hardened steel, tungsten carbide, stellite and the like cannot therefore be textured by a shot blasting technique. Further, shot blasting is inherently a random and uncontrollable process by which only relatively coarse surface finishes can be achieved, that is to say a surface roughness approximating to 2 to 5 micro meters and a peak count of 100 peaks per inch.

In addition to the shot blasting techniques discussed above, a variety of electrical discharge techniques have also been employed to remove discrete particles from the work surface by a train of electrical pulses directed at and onto the work surface. One disadvantage of known electrical discharge machining techniques is the need to maintain the electrodes in close proximity to the roll surface to be treated to create the required electrical sparking between the electrodes and the roll surface. The resulting small gap extant between the two (conventionally of the order of 20-25 microns) can become at least partially filled and consequently bridged with particles of the same order of size removed from the roll surface.

DESCRIPTION OF THE PRIOR ART

An electrical discharge technique for texturing the surface of an object such as a mill roll is disclosed in our co-pending Great Britain patent application No. 8712753 and U.S. patent application No. 200,693. In the technique disclosed in this application, a series of electrical discharges is passed to the work roll surface from electrodes positioned adjacent the roll surface through a dielectric fluid present within the gap between the electrodes and the work surface. As explained above, because of the smallness of this gap, the gap can become bridged by particles machined from the work surface. The use of a dielectric fluid for filling the gap between an electrode and a work surface is well known. In many instances, steps have been taken to ensure that the dielectric remains free of contaminants during the machining process. Thus GB 1121923 describes electrical discharge machining apparatus in which dielectric fluid is withdrawn from a tank in which the machining operations takes place and filtered to remove contaminants before being returned to the tank for future use. Other methods of electro-erosion or cutting are known in which particles are added to the dielectric. Thus, GB-A-2074073 discloses a method of electroerosive wire cutting in which a wire electrode is advanced through a water machining medium to which abrasive particles of a size between 1 and 100 microns are mixed in a proportion of 15% by volume. The particles abrade the workpiece surface as they are carried through the machining gap by the wire electrode. As emphasised by the high volume content of particles within the water machining medium, these particles are present mechanicaly to abrade the workpiece surface.

GB-A-2065935 discloses an electro-discharge machining process in which graphite or aluminium powder of "not more than a few microns" is added to a dielectric. GB-A-2065935 recognizes the need to maintain an adequate concentration of solid particles in suspension within the dielectric fluid in order to achieve a stable and efficient rate of machining. A concentration of about 1% by volume is specified. In the arrangement disclosed in GB-A-2065935, the concentration of particles in suspension in the dielectric is variable. WO 80/00669 discloses an electro-discharge machining process in which solid conductive particles of a size of at most 5 microns are held in suspension in a dielectric to improve the machining process. The concentration of solid particles in suspension is said to be between 0.001 and 1.0% by volume.

GB-A-2065935 and WO 80/00669, therefore, teach a maximum permissible particle size of 5 microns and a relatively low concentration of particles in suspension. GB-A-207073 teaches a larger particle size but for mechanical abrasion purposes and a consequent high concentration within the appropriate machining medium. It has been established by the Applicants that a particle size of 5 microns or less is insufficient to achieve conditions consistent with efficient operation of a surface texturing process. Indeed, the use of such particles has been found to be deleterious. In addition, it has been appreciated that a particle concentration greater than 7% by volume is disadvantageous in the texturing process because such a high concentration tends to inhibit the required free flow of dielectric through the machining gap.

More particularly the presence of solid particles of a given size and in a given concentration within a dielectric introduces discontinuities which increase the probability that the dielectric will break down under the stress induced by an electrical pulse applied across the dielectric. The number of dielectric break downs which occur in any given time period is related directly to the number of effective electrical discharges produced and, therefore, the speed and effectiveness of the texturing operation.

As mentioned previously, Applicants have established that the ability of solid particles to promote breakdowns in the dielectric is dependant upon the size and concentration of the particles present in the dielectric. More especially, Applicants have established that particles which are generally of a size below 7 microns are ineffective in promoting the required dielectric break downs. Further, Applicants have established that for efficient texturing, the concentration of particles within the dielectric should not be greater than 7% volume and preferably lies within the range 0.05% to 7% by volume.

SUMMARY OF THE INVENTION

The present invention sets out to provide electrical discharge apparatus and a method of operation thereof which, by the use of a dielectric fluid dosed with particles of a size significantly larger than used hitherto, has distinct advantages over previously known apparatus and methods.

According to the present invention in one aspect there is provided electrical discharge apparatus comprising a plurality of electrodes mounted on a carrier and spaced from the workpiece surface to define a gap across which a series of electrical pulses is transmitted and within which a dielectric fluid is present, means for moving the electrode carrier relative to the workpiece surface, and means for making to the dielectric fluid controlled additions of solid particles of a material of different electrical conductivity and/or permittivity to that or those of the dielectric fluid, the concentration by volume of the particles in suspension within the dielectric fluid lying in the range 0.05% to 7.0% and the size of the majority of the added particles being in excess of 7 microns.

Preferably, the particles lie within the range 10 microns to 70 microns. A still further preferred particle size range is from between 12 to 50 microns.

Typically, the mean particle size lies within the range 25 to 35 microns.

The particles may be of a material having a relatively high electrical conductivity, e.g. graphite or metallic particles; alternatively, the particles or fibres may be formed from a material having good electrical insulating properties.

Typically, the dielectric fluid comprises a light hydrocarbon oil, white spirit, kerosene or deionised water. The workpiece may comprise a work roll, means being provided to impart rotation to the work roll as the electrode head is moved linearly with respect thereto. The electrode head may carry a multiplicity of individual electrodes, each insulated one from another and each connected to an electrical power source.

According to the present invention in another aspect, there is provided a method of applying a machined or textured finish to the surface of an electrically conductive workpiece by an electrical discharge technique, which method comprises effecting relative movement between an electrode carrier including a plurality of electrodes and the workpiece surface, applying across the gap defined between the electrodes and the adjacent workpiece surface a series of discrete electrical discharges thereby to remove particles from the workpiece surface, and supplying to the gap present between the electrodes and the workpiece surface a dielectric fluid in which is dispersed a quantity of particles of a material of different electrical conductivity and/or permittivity to that or those of the dielectric fluid, the concentration by volume of the particles in suspension within the dielectric fluid lying in the range 0.05% to 7.0% and the size of the majority of the particles in suspension being in excess of 7 microns. The electrodes may be arranged in a uniform pattern, adjacent electrodes being equi-distant from one another. The head may be moved towards and away from the workpiece surface by a servo-system to maintain an appropriate gap between one or each electrode and the workpiece surface. This servo-system may operate automatically in response to changes in a monitored characteristic of the voltage conditions extant between a selected one of the several electrodes and the workpiece surface during the normal spark discharge period of the selected electrode.

In a preferred arrangement, the electrodes are submerged in a common bath of dielectric fluid contained within a gaiter, one side of which is closed by its abuttment with the workpiece surface. The gaiter may be open-topped or fully enclosed. Dielectric fluid may continuously or periodically be added to the bath contained within the gaiter, the fluid being allowed to overflow from one or each side walls of the gaiter thereby to ensure a continuous flow of dielectric fluid to and from the bath.

The dielectric fluid may be conveyed to the gap through one or more nozzles positioned between two or more electrodes. Dielectric fluid may be caused to flow through the nozzles by a positive pressure applied to fluid entering the ends of the nozzles remote from the workpiece or by a negative pressure applied to fluid leaving the nozzles.

Particles may be pre-mixed with the dielectric fluid or may be added continuously to the dielectric fluid present in the gaiter.

The electrical discharges may be over-voltage initiated.

A plurality of electrode heads may be provided, each equipped with electrical contact blocks to connect in a selected manner with the power supply; thus, the number and pattern of electrodes employed at any given time can readily be changed.

BRIEF DESCRIPTION OF THE DRAWINGS

The invention will now be described by way of example only with reference to the accompanying diagrammatic drawings in which.

DESCRIPTION OF THE PREFERRED EMBODIMENT OF THE INVENTION

Figure 1:
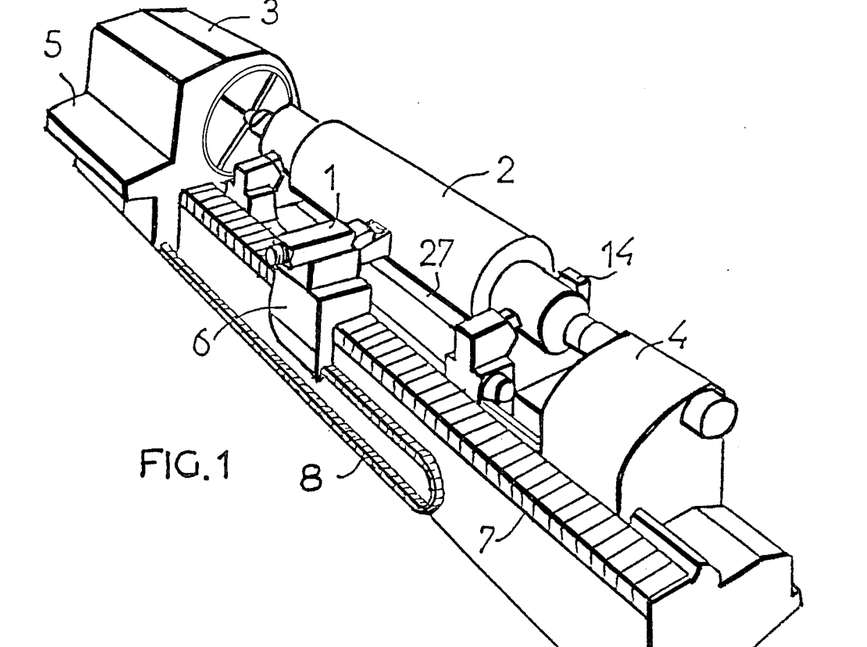
FIG. 1 is a perspective view which diagrammatically illustrates electrical discharge apparatus in accordance with the invention mounted adjacent to a work surface of a mill roll.
Figure 2:
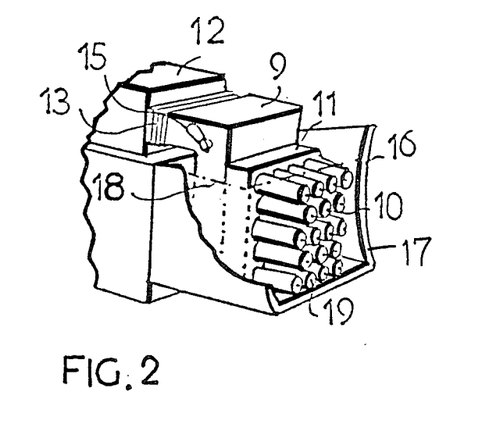
FIG. 2 is a side elevational view to an enlarged scale of a dielectric container which forms part of the electrical discharge apparatus illustrated in FIG. 1 with one side wall of the container partly removed for ease of reference.

In FIGS. 1 and 2 of the drawings, electrical discharge apparatus 1 in accordance with the invention is shown positioned adjacent the work surface of a mill roll 2. The mill roll 2 is mounted horizontally for rotation about is longitudinal axis between a headstock 3 driven by an electric motor (not shown) over a controlled range of speeds and an idler tailstock 4 of a lathe-type machine 5. The electrical discharge apparatus 1 is mounted on a carriage 6 driven lengthwise of the mill roll 2 by a second electric motor (not shown) along a track 7 positioned to one side of the roll 2. The carriage is coupled to a control console 5 via a cable housed within an articulated conduit 8.

As will be seen more clearly from FIG. 2, the apparatus 1 includes a head 9 comprising an array of electrodes 10 supported within a block 11 of insulating material such that each individual electrode is insulated electrically from its neighbours. The supported ends of the electrodes 10 may be threaded and engage complimentary threaded bores extending into and through the block 11. Thus, the electrodes can readily be removed from their seatings within the block. Other methods of removably mounting the electrodes with respect to the block can be adopted. The head 9 is movable by a servomotor towards and away from the roll 2 and is supported from a housing 12 in which is located electrical connections for coupling each electrode to an individual source of pulsed direct current and for controlling head movement in dependence upon one or more monitored characteristics of the voltage conditions present within the gap which, in use, exists between the electrodes 10 and the surface of the roll 2. The head 9 may be subdivided and driven towards and away from the roll surface by one or more servo motors such that smaller groups of electrodes to that illustrated can be carried by separate heads. A bellows-type seal 13 is provided between the head 9 and housing 12 to accommodate movements of the head towards and away from the roll for prepositioning needs.

Electrical contact between the pulsed DC power supply and the roll 2 can be effected by brushes 14 which bear against a portion of the roll neck at one end of the roll. Alternatively a purpose built rotating contact arrangement can be devised.

The head 9 can selectively be removed from its connection to housing 12 by operation of a lever 15 or some other similar guide release system. Thus, several individual heads 9 each having standard electrical connections and each including electrode arrays differing in number and configuration may be provided to accommodate any one of a predetermined number of applications.

The electrodes 10 protrude into a bath of dielectric fluid contained within a gaiter 16 which abuts at its open side against the adjacent roll surface. The leading edge 17 of the gaiter 16 is of a flexible material and is curved in a complementary sense to the radius of the roll to provide a relatively good seal between the gaiter edge 17 and the abutting roll surface. Thus, the electrodes 10 and the adjacent work surface of the roll are totally immersed in a common bath of dielectric fluid. The level of the bath of dielectric fluid is indicated by broken line 18. The choice of dielectric fluid is dependent upon various properties necessary to achieve the required electro-discharge characteristics. Suitable dielectric fluids include hydrocarbon fluids and deionised water. The dielectric fluid may be subjected to temperature control to promote breakdown of its insulating properties. Alternatively, a heating element may be positioned within the dielectric bath for this purpose.

Dielectric fluid is admitted to the bath through nozzles interposed between individual electrodes.

As will be described later, the dielectric fluid contains a dispersion of solid particles of a size generally no less than 7 microns and in a concentration of between 0.05% and 7% by volume. The presence of these particles introduce discontinuities which increase the probability that the dielectric will break down under the stress induced by an electrical pulse applied across the dielectric. The number of dielectric breakdowns which occur in any given time period determines directly the number of effective electrical discharges produced and, therefore, the speed and effectiveness of the texturing operation. The roll contacting edge of the gaiter 10 may be manufactured from any suitable material, these including plastics and rubber.

Figure 3:
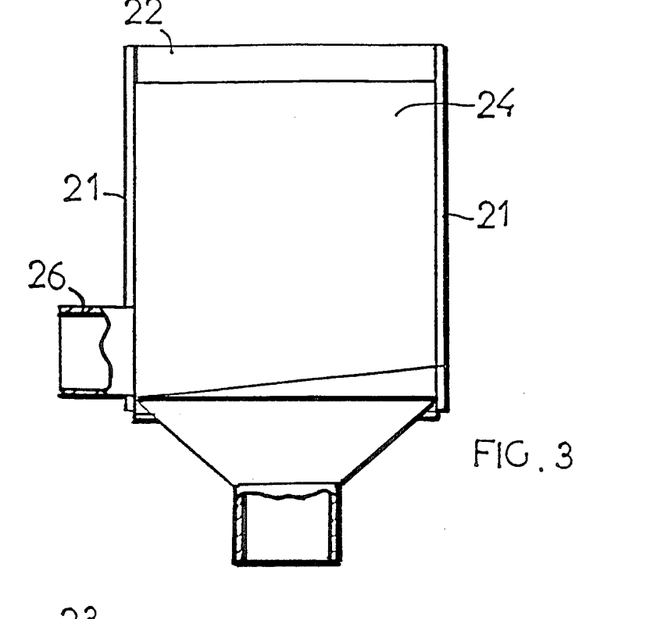
FIGS. 3 to 5 are respectively a front view, plan view from above and a side view of a dielectric container in accordance with the invention.
Figure 4:
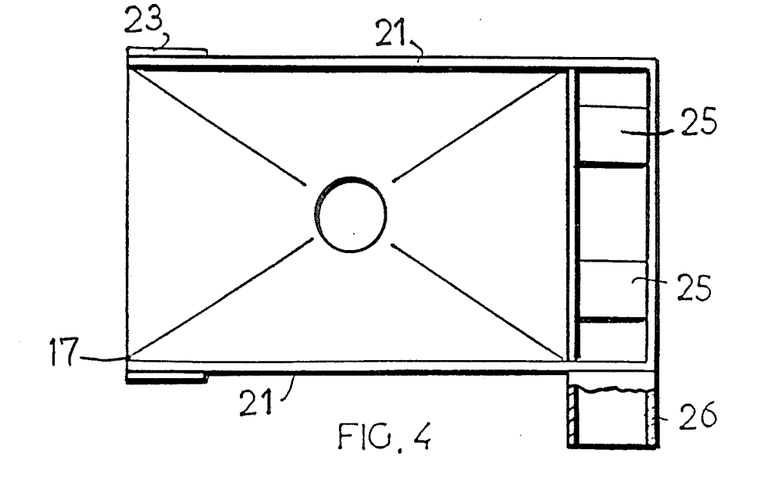
Figure 5:
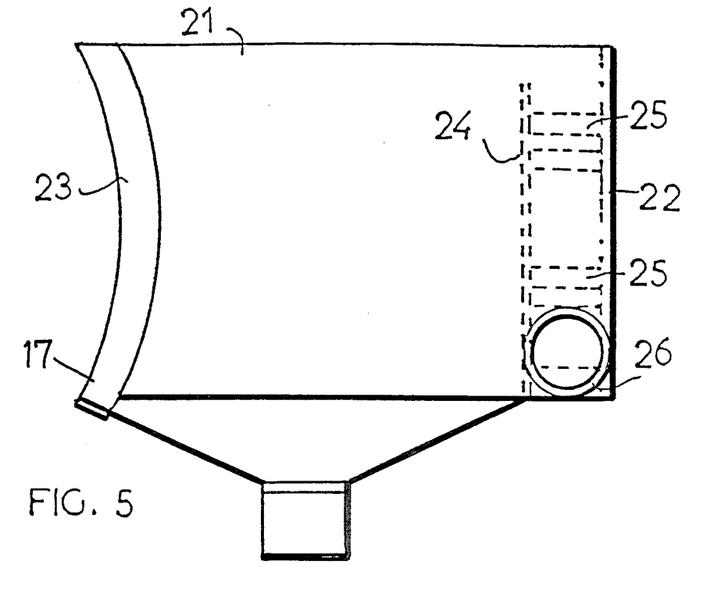

The gaiter is illustrated in greater detail in FIGS. 3 to 5. Referring now to these FIGS. the gaiter 16 is open-topped and comprises side walls 21 and a rear wall 22. The leading edge 17 of the gaiter which, in use, abuts the adjoining surface of the roll 2 is bounded by a flexible edge strip 23 for both sealing purposes and for preventing damage to the roll surface. Positioned within the gaiter 16 is a weir wall 24 over the upper rim of which, in use, dielectric fluid flows to maintain a level of dielectric fluid in the gaiter consistent with the height of the wall 24. The wall 24 is secured to the rear wall 22 of the gaiter by a series of spacers 25. Dielectric fluid leaving the gaiter 16 flows via an outlet 26 towards the base of the channel defined between the weir wall 24 and the rear wall 22 and is collected within a tray 27 (see FIG. 1) positioned below and to one side of the roll and returned to the gaiter following cleansing cooling and the controlled addition of solid particles within the prescribed size range and to the prescribed concentration.

The continuous flow of dielectric fluid ensures that the temperature of the fluid contained within the gaiter is maintained at or close to a present value and that metal particles removed from the roll surface and other sparking by-products are not retained within the bath. The bath may be agitated ultrasonically in use to remove contaminants from the roll surface.

The choice of dielectric fluid is dependent upon various properties necessary to achieve the required electro-discharge characteristics. Suitable dielectric fluids include a standard EDM dielectric fluid, e.g. a light hydrocarbon oil, white spirit, kerosene or deionised water.

As mentioned previously, in order to decrease the breakdown strength of the dielectric and hence increase the length of the gaps extant between the electrodes and the work surface for a constant applied voltage, a quantity of particles of a material having a different electrical conductivity and/or permittivity to that or those of the dielectric fluid is uniformly dispersed within the fluid at the start of the process and, in some cases, during the operation thereof. The size and concentration of these solid particles within the dielectric are important. In order to increase the probability of dielectric breakdowns occurring, it has been established that a particle size no less than 7 microns is required. It is therefore essential that the majority of particles added to the dielectric are of a size greater than 7 microns.

Essentially, a particle size of 7 microns or more is required. Preferred ranges of particle size are 10 to 100 microns, 15 to 70 microns, 20 to 70 microns and 25 to 50 microns. The concentration of particles within the dielectric is equally important in that a concentration in excess of 7% by volume will inevitably inhibit the flow of dielectric through the discharge gap and may lead to blockage of this gap; furthermore, too small a concentration will not produce the required quantity of dielectric breakdowns. Thus a concentration of no greater than 7% by volume and no less than 0.05% is essential for efficient operation of the texturing process. Preferred ranges of concentration are 1% to 4% by volume; and 2% to 4% by volume.

Figure 6:
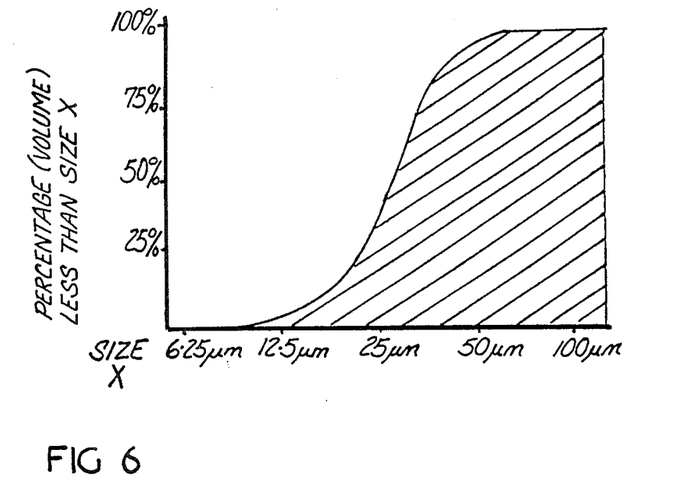
FIGS. 6 and 7 graphically illustrate typical size and concentration ranges of solid particles present in dielectric fluid used in electrical discharge apparatus in accordance with the invention at the start of such use and at a time shortly thereafter.
Figure 7:
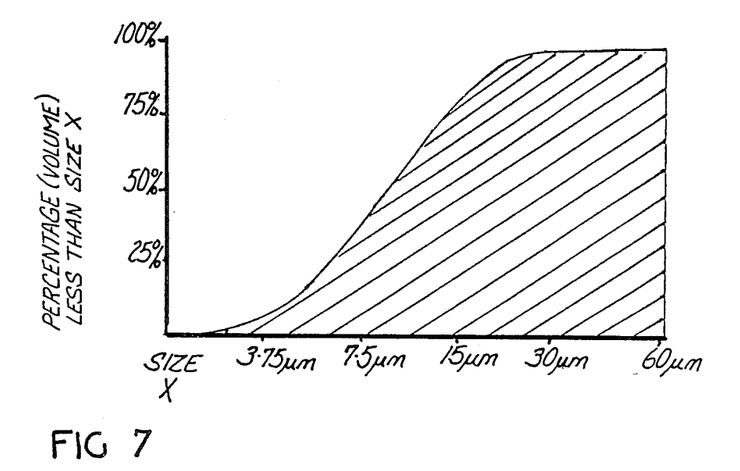

Turning now to FIGS. 6 and 7, the first of these two figures illustrates typically the percentage volume of particles of different sizes present in the dielectric fluid at initiation of the texturing process. It will be seen from these figures that only approximately 5% of the particles present in the dielectric are of a size less than 12.5 microns; that approximately 25% of the particles are of a size less than 20 microns; that approximately 50% of the particles are of a size in excess of 30 microns. The smallest particles shown on the graph are approximately 6.25 microns and the largest approximately 70 microns.

FIG. 7 illustrates typically the percentage volume of particles present in a dielectric after a few hours operation when, due to the reduction in particle size caused by their interaction with the electrical pulses, the particles are only just effective in promoting dielectric breakdowns. From FIG. 7 it can be seen that the majority of particles present in the dielectric are of a size of 10 microns or less. When the particle size of 50% or more of the particles drops below approximately 7 microns, the particles become ineffective in ensuring a high probability of dielectric breakdowns.

The particles may be pre-mixed the dielectric fluid or may continuously or periodically be added to the dielectric fluid present in the gaiter 16.

It has been observed that the presence within the dielectric of solid particles of a size and within the concentration specified can increase the gap length typically by a multiple of five. The particles may be electrically conductive, e.g. of graphite or a metallic material, or may be electrical insulators.

The gaiter may be manufactured from any suitable material, these including plastics and rubber. Dielectric fluid is continuously admitted to the fluid bath and is allowed to overflow therefrom, and is conveniently collected within a tray 27 positioned below and to one side of the roll and returned following cleansing and cooling to the fluid supply.

The continuous flow of dielectric fluid ensures that the temperature of the fluid contained within the gaiter is maintained at or close to a preset value and that undersized particles and metal particles removed from the roll surface and other sparking by-products are not retained within the bath. The bath may be agitated ultrasonically in use to remove contaminantes from the roll surface.

Figure 8:
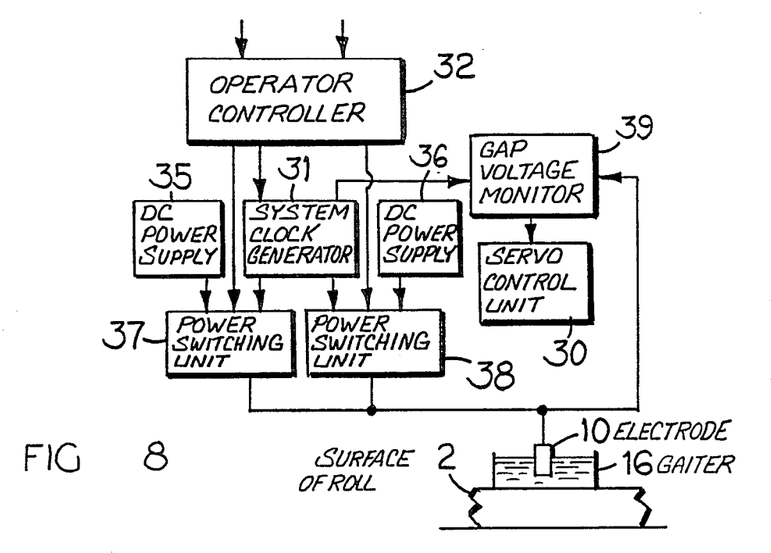
FIG. 8 is a block diagram which diagrammatically illustrates a control system used in association with electrical discharge apparatus in accordance with the invention.

Turning now to FIG. 8, the block diagram illustrates the electrical power supply to the electrodes 10 of the head 9 and the method by which an appropriate gap distance between the electrodes and the roll surface to be textured is monitored and controlled.

In operation of the roll machining or texturing process, it is necessary to ensure that a monitored characteristic of the voltage conditions existing between the electrodes and the roll surface which is responsive to ignition delay, is maintained within predetermined limits. If the mean voltage is too high during the sparking period, an open circuit condition exists with insufficient current discharge to generate the sparks necessary to remove material from the roll surface. If the voltage is too low, however, arcing occurs with consequent damage to the roll surface. To achieve the required conditions for sparking and consequently texturing to occur, the mean voltage extant across the gap between the electrodes and the roll must be maintained at a level to achieve an appropriate ignition delay.

Factors which affect the break-down voltage across the gap include the minimum distance between the electrodes and the roll surface; surface roughness; the insulating characteristics of the dielectric fluid; and the level of pollution across the gap. The dispersion of particles within the dielectric reduces its breakdown strength and, therefore, enables a larger than conventional gap to be present for a given constant applied voltage.

The texturing process is essentially controlled by monitoring the delay time between the application of a pulse and the initiation of current flow across the gap (a characteristic of the voltage conditions within the gap) and controlling the gap by changing the position of the electrodes relative to the roll surface to maintain the monitored delay time within predetermined values to achieve the required sparking condition. Other characteristics of the voltage conditions can be employed.

As shown in FIG. 8, the gap between the electrodes 9 (only one of which is illustrated in FIG. 8 for ease of reference) and the adjacent surface of the roll 2 is controlled via one or more servo control units 30 (only one of which is shown). A system clock generator 31 generates electrical pulses, the pulse width and pulse interval of which are selected by an operator via a controller 32.

The DC power supplies to the electrodes are indicated by reference numerals 35 and 36 and power switching units are illustrated at 37 and 38.

When voltage is first applied, an open circuit condition subsists and no current flows. The servo control unit 30 then operates to drive the electrodes 10 towards the roll surface thereby reducing the distance therebetween. As the gap reduces the break-down voltage of the dielectric fluid is reached and sparks flow between the electrodes 10 and the roll surface 2. Due to these repetitive discharges, the surface temperature of the roll rises rapidly and small areas on the roll surface melt to produce minute craters on the surface.

As the process continues, the electrodes are themselves worn away thereby increasing the gap distance. This condition is detected at gap voltage monitor 39 and the servo control unit 30 operates to drive the electrodes 10 towards the roll surface 2. If the electrodes move too close to the roll surface, the servo control unit 30 is operated to move the electrodes away from the roll surface.

It will be appreciated that the apparatus and methods described above are merely exemplary of electrical discharge apparatus and methods of operation in accordance with the invention and that modifications can readily be made thereto without departing from the true scope of the invention as defined by the appended claims.

We claim:

1. Electrical discharge apparatus comprising a plurality of electrodes mounted on a carrier and spaced from a workpiece surface to define a gap across which a series of electrical pulses is transmitted and within which a dielectric fluid is present, means for moving the electrode carrier relative to the workpiece surface, and means for making to the dielectric fluid controlled additions of solid particles of a material of different electrical conductivity and/or permittivity to that or those of the dielectric fluid, the concentration by volume of the particles in suspension within the dielectric fluid lying in the range 0.05% to 7.0% and the size of the majority of the added particles in suspension being in excess of 7 microns.

2. Apparatus as claimed in claim 1 wherein the particles are graphite particles.

3. Apparatus as claimed in claim 1 wherein the majority of particles are of a size which lies within the range 10 to 100 microns.

4. Apparatus as claimed in claim 3 wherein the majority of particles are of a size which lies within the range 20 to 50 microns.

5. Apparatus as claimed in any one of claim 1 wherein the concentration of particles present in suspension in the dielectric fluid lies in the range 1% to 4% by volume.

6. Apparatus as claimed in any one of claim 1 wherein the majority of particles in suspension are of a size in excess of 20 microns.

7. Apparatus as claimed in claim 1 wherein the workpiece comprises a work roll, means being provided to impart rotation to the work roll as the electrode carrier is moved linearly with respect thereto.

8. Apparatus as claimed in claim 7 wherein the electrode carrier carries a multiplicity of individual electrodes, each insulated from the other electrodes and each connected to a common electrical power source.

9. A method of applying a machined or textured finish to the surface of an electrically conductive workpiece, which method comprises effecting relative movement between an electrode carrier including a plurality of electrodes and the workpiece surface, applying across the gap defined between the electrodes and the adjacent workpiece surface a series of discrete electrical discharge thereby to remove particles from the workpiece surface, and supplying to the gap present between the electrodes and the workpiece surface a dielectric fluid in which is dispersed a quantity of particles of a material of different electrical conductivity and/or permittivity to that or those of the dielectric fluid, the concentration by volume of the particles in suspension within the dielectric fluid lying in the range 0.05% to 7.0% and the size of the majority of the particles in suspension being in excess of 7 microns.

10. A method as claimed in claim 9 wherein the majority of particles are of a size which lies within the range 10 to 100 microns.

11. A method as claimed in claim 9 wherein the majority of particles are of a size which lies within the range 20 to 50 microns.

12. A method as claimed in claim 9 wherein the concentration of particles in suspension in the dielectric fluid lies in the range 1% to 4% by volume.

13. A method as claimed in claim 9 wherein the dielectric fluid is contained as a bath of fluid within a gaiter, one side of which is closed by its abutment with the workpiece surface, the method further comprising the steps of adding dielectric fluid continuously or periodically to the bath to cause fluid to overflow one wall of the gaiter to provide a continuous flow of dielectric fluid to and from the bath.

14. A method as claimed in claim 13 wherein particles are pre-mixed with the dielectric fluid or added continuously to the dielectric fluid supplied to the bath.

* * * * *

UNITED STATES PATENT AND TRADEMARK OFFICE
CERTIFICATE OF CORRECTION

PATENT NO. : 4,870,243

DATED : September 26, 1989

INVENTOR(S) : Geoffrey Wilson et al.

It is certified that error appears in the above-identified patent and that said Letters Patent is hereby corrected as shown below:

Column 9, line 16, delete "any one of".

Column 9, line 20, delete "any one of".

Column 10, line 4, delete "discharge" and insert --discharges--.

Signed and Sealed this

Twenty-third Day of October, 1990

*Attest:*

HARRY F. MANBECK, JR.

*Attesting Officer*  *Commissioner of Patents and Trademarks*